(12) United States Patent
Watanabe (10) Patent No.: US 6,384,551 B1
(45) Date of Patent: May 7, 2002

(54) CONTROL APPARATUS FOR AC GENERATOR FOR GRADUALLY CHANGING OUTPUT VOLTAGES WHEN CHANGING OPERATING MODES

(75) Inventor: Hirofumi Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/628,100

(22) Filed: Apr. 9, 1996

(30) Foreign Application Priority Data

Sep. 6, 1995 (JP) .............................. 7-229257

(51) Int. Cl.[7] .............................................. H02P 1/00
(52) U.S. Cl. ..................................................... 318/139
(58) Field of Search ................................ 318/139, 376, 318/105, 106, 107, 108, 440–442; 320/61–72, 27, 30, 39, 9; 307/10.1, 64–68

(56) References Cited

U.S. PATENT DOCUMENTS

| | | | | |
|---|---|---|---|---|
| 3,569,809 A | * | 3/1971 | Comer | ........................ 388/806 |
| 4,084,126 A | | 4/1978 | Clements | |
| 4,814,631 A | * | 3/1989 | Jackson | ........................ 307/53 |
| 4,985,670 A | | 1/1991 | Kaneyuki et al. | |
| 5,080,059 A | * | 1/1992 | Yoshida et al. | ................. 320/72 |
| 5,087,865 A | * | 2/1992 | Nelson, III | ................... 318/139 |
| 5,350,992 A | * | 9/1994 | Colter | ......................... 318/807 |
| 5,635,804 A | * | 6/1997 | Tanaka et al. | ............... 318/139 |

FOREIGN PATENT DOCUMENTS

| | | |
|---|---|---|
| EP | 407 633 | 1/1991 |
| EP | 430 203 | 6/1991 |
| EP | 661 791 | 7/1995 |
| JP | 63302735 | 12/1988 |
| JP | 1206848 | 8/1989 |

\* cited by examiner

*Primary Examiner*—Jonathan Salata
(74) *Attorney, Agent, or Firm*—Sughrue Mion, PLLC (57) ABSTRACT

A control apparatus for an AC generator of a motor vehicle includes a rectifier (2) for rectifying a voltage generated by an AC generator (1) which is driven by an internal combustion engine and has a field coil (102), a battery (4) charged with electric energy outputted from the rectifier (2), a high-voltage electric load (5) of the motor vehicle supplied with electric energy from the output of the rectifier (2), a mode setting means (8) for changing over the output of the rectifier (2) to the battery (4) or the high-voltage electric load (5) of the motor vehicle to thereby set a battery charging operation mode or a high-voltage operation mode, and a voltage regulator (3A) for controlling a field current flowing through the field coil (102) so that the field current increases gradually at rate of changes set for the operation modes, respectively, to thereby regulate an output voltage of the AC generator (1) to a predetermined value in each of the operation modes as set. Engine rotation control can be performed with high accuracy and reliability regardless of variation in the load of the AC generator upon load changeover thereof.

9 Claims, 7 Drawing Sheets

CONTROL APPARATUS FOR AC GENERATOR FOR GRADUALLY CHANGING OUTPUT VOLTAGES WHEN CHANGING OPERATING MODES

BACKGROUND OF THE INVENTION

1. Field of the Invention

The present invention generally relates to a control apparatus for an AC generator of a motor vehicle and more particularly to a control apparatus for an AC generator of a motor vehicle for changing over power supply to a high-voltage electric load driven at a higher voltage level than an ordinary one.

2. Description of Related Art

Figure 6:
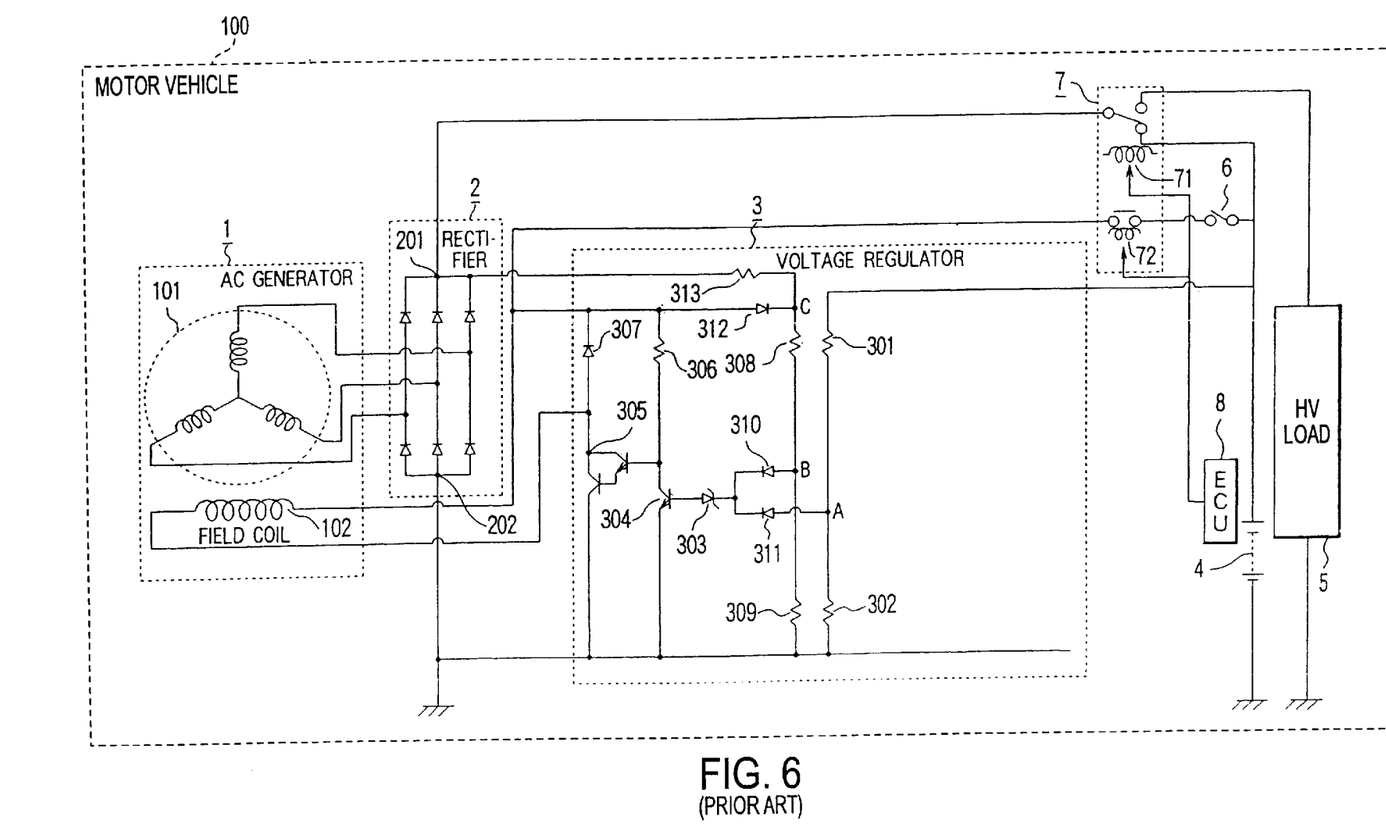
FIG. 6 is a circuit diagram showing a structure of a conventional control apparatus for an AC generator of a motor vehicle.

For having better understanding of the present invention, background techniques thereof will be described in some detail. FIG. 6 is a circuit diagram showing a structure of a conventional control apparatus for an AC generator of a motor vehicle known heretofore such as disclosed, for example, in Japanese Unexamined Patent Application Publication No. 206848/1989 (JP-A-1-206848). Referring to the figure, the conventional control apparatus is comprised of an AC generator (alternating current generator) 1 driven by an internal combustion engine of a motor vehicle (not shown) and constituted by a field coil 102 for generating a rotating magnetic field and an armature coil 101 for generating an AC voltage under the action of the rotating magnetic field as generated, a rectifier 2 for full-wave rectification of the electric power generated by the AC generator 1, an output change-over controller 7 for changing over the supply of the rectified output power of the rectifier 2 between a battery 4 and a high-voltage onboard electric load (e.g. high-voltage equipment of a motor vehicle) 5, a key switch 6 which is closed for starting operation of the internal combustion engine by connecting a pulse terminal (i.e., terminal of positive polarity) of the battery 4 to the field coil 102 via the output change-over controller 7 for allowing a field current to flow through the field coil 102, an engine control unit 8 (hereinafter referred to as the ECU for short) for outputting an ON/OFF signal to an excitation switch 72 for allowing supply of the output of the ECU 8 for a predetermined time, and a voltage regulator 3 for regulating the generated voltage by controlling the exciting current of the field coil 102 in dependence on the terminal voltage of the battery 4.

The voltage regulator 3 is implemented in a circuit configuration described below. Connected between the plus terminal of the battery 4 and a grounded minus terminal 202 of the rectifier 2 are voltage division resistors 301 and 302 which serve as a first voltage detection means, wherein the terminal voltage of the battery 4 is detected as a divided voltage which makes appearance at a voltage dividing point A between the voltage division resistors 301 and 302. Further, voltage division resistors 313, 308 and 309 are connected in series between the plus terminal 201 and the minus terminal 202 of the rectifier 2 to serve as a second detection means and a third detecting means, respectively. The rectified output voltage making appearance at the plus terminal 201 is detected as a divided voltage appearing at a voltage dividing point B between a third detection means constituted by voltage division resistors 313 and 308 and the resistor 309.

Connected between the excitation terminal of the positive polarity and a minus terminal 202 is a transistor 304 which has a collector connected to a load resistor 306 and an emitter connected to the ground potential, wherein the base of the transistor 304 is connected to the anode of a Zener diode 303 which has a cathode to which cathodes of diodes 310 and 311 having anodes connected to the voltage dividing points A and B, respectively, are connected in common. These diodes 310 and 311 serve for isolating the first detection means and the second detection means, respectively. Furthermore, a diode 312 is connected between the voltage dividing point C and the plus excitation terminal (i.e., terminal of positive polarity) of the field coil 102. The diode 312 isolates the second detection means and the third detection means from each other.

Thus, it is apparent that each of the diodes 310, 311 and 312 is constituted by a reverse blocking diode provided for isolating the detection means from each other. The Zener diode 303 is turned on (i.e., becomes conducting) when the voltages appearing at the circuit points A and B reach a predetermined level to thereby allow the transistor 304 to become conducting (or assume on-state).

Further, connected between the plus excitation terminal and the minus terminal 202 is an output transistor 305 having a collector connected to a diode 307 and an emitter connected to the ground potential, wherein the bases of the output transistor 305 is connected to the collector of the transistor 304.

Parenthetically, the collector of the output transistor 305 is connected to the minus excitation terminal of the field coil 102. Thus, the diode 307 is connected in parallel to the field coil 102 and serves for absorbing a surge of relatively long duration generated in the field coil 102 upon turning off the output transistor 305.

Now, description will turn to operation of the AC generator control apparatus of the structure described above. Ordinarily, the output change-over switch 71 of the output change-over controller 7 is changed over toward the battery 4, whereby the ordinary operation mode (battery charging operation mode) is set. On the other hand, when the output change-over switch 71 is changed over to the high-voltage onboard electric load 5 for a short time (e.g. about five minutes), a high-voltage operation mode is validated, which mode is validated for activating, for example, a defrosting/defreezing system for removing ice adhering or sticking to window glass of motor vehicles in winter or in severe cold districts. This operation mode is changed-over from the ordinary operation mode. The high-voltage onboard electric load 5 may be constituted by a heater, for example.

In the first place, the ordinary operation mode will be elucidated. When the key switch 6 is closed for starting operation of the internal combustion engine to thereby close the excitation switch 72, field current flows to the field coil 102 from the battery 4 via the key switch 6 and the excitation switch 72. Thus, the AC generator 1 is set to the state ready for generation of an AC power. Subsequently, when the AC generator 1 starts electric power generation upon starting of the engine operation, the voltage appearing at the plus terminal 201 of the rectifier 2 rises up. The battery 4 is charged with the rectifier output via the output change-over switch 71, resulting in that the terminal voltage of the battery 4 rises up.

The terminal voltage of the battery 4 is detected in terms of a divided voltage resulting from the voltage division by the voltage division resistors 301 and 302 incorporated in the voltage regulator 3. When the divided voltage making appearance at the voltage dividing point A between the voltage division resistors 301 and 302 reaches a turn-on voltage of the Zener diode 303 as the terminal voltage of the battery 4 increases, the Zener diode 303 becomes conducting, whereby the transistor 304 is turned on while the output transistor 305 is turned off to thereby interrupt the field current. By contrast, when the terminal voltage of the battery 4 lowers below the predetermined level mentioned previously, the Zener diode 303 is set to the non-conducting or off-state. As a result of this, the output transistor 305 is tuned on to allow the field current to flow.

In this manner, the transistor 304 is repetitionally turned on and off as the Zener diode 303 assumes the on- and off-states respectively, as a result of which the output transistor 305 is repeatedly turned on and off to effect an intermittent interruption control of the field current flowing through the field coil 102 for thereby regulating the terminal voltage of the battery 4. In case a wire interconnecting the battery voltage detection terminal and the first detection means for detecting the terminal voltage of the battery 4 should be broken due to vibration of the internal combustion engine or for any other reason, the terminal voltage detecting operation will be rendered impossible because the battery terminal voltage can no more be applied to the first detection means which is constituted by the voltage division resistors 301 and 302.

In that case, however, the battery terminal voltage is supplied to the plus excitation terminal of the field coil 102 from the battery 4 via the key switch 6 and the excitation switch 72. Thus, the battery terminal voltage is applied to the second detection means (constituted by the voltage division resistors 308 and 309) via the diode 312. Consequently, the battery terminal voltage can be detected by the second detection means in terms of a divided voltage making appearance at the voltage dividing point B between the voltage division resistors 308 and 309.

In the second detection means, the voltage division resistance ratio is so dimensioned as to be slightly greater than that of the first detection means for obtaining the divided voltage for making the Zener diode 303 conducting. Accordingly, the charging voltage can be controlled even when the battery terminal voltage is not fed back due to the wire breakage, whereby the battery 4 can be prevented from being overcharged. Thus, the battery 4 can be protected against damage due to the overcharge.

Now, description will turn to a high-voltage operation mode in which the generator output is changed over to the high-voltage onboard electric load 5. For changing over the output of the rectifier 2, the excitation switch 72 is previously opened once under the control of the engine control unit 8 for damping the field current with a view to protecting the switch contacts from injury due to spark possibly produced in the output change-over switch 71.

After lapse of a predetermined time required for the attenuation of the field current, the output change-over switch 71 is changed over to the high-voltage onboard electric load 5, whereon the excitation switch 72 is closed under the control of the engine control unit 8. The sequential control of the change-over switch such as mentioned above can be appropriately programmed in a processing unit incorporated in the output change-over controller 7 in a conventional manner which will readily occur to those skilled in the art without any further elucidation. When the field current flows through the field coil 102 upon closing of the excitation switch 72, the voltage generated by the AC generator 1 increases, incurring a corresponding rise-up of the rectifier output voltage making appearance at the plus terminal 201.

In the high-voltage operation mode, the output of the rectifier 2 is disconnected from the battery 4. Consequently, the first and second detection means are rendered inactive.

Thus, the terminal voltage of the plus terminal 201 is detected by the third detection means constituted by the voltage division resistors 313, 308 and 309. In this conjunction, it is to be noted that when the detection voltage for making the Zener diode 303 conducting is to be derived through the third detection means, the voltage division resistance ratio is so dimensioned that the voltage applied to the third detection means is higher than that applied to the first detection means.

More specifically, when the output of the rectifier 2 exceeds a preset high-voltage level determined by the resistance values of the voltage division resistors 313, 308 and 309 and the 303, the latter becomes conducting to thereby turn on the transistor 304 while the output transistor 305 being turned off. Subsequently, the rectified output voltage of the rectifier 2 is regulated to the preset high-voltage level by interrupting the field current to thereby stop the electric power generating operation. In this manner, the rectifier output of a proper value can be supplied directly to the high-voltage onboard electric load 5 such as a heater of a defreezing/defrosting system.

Figure 7:
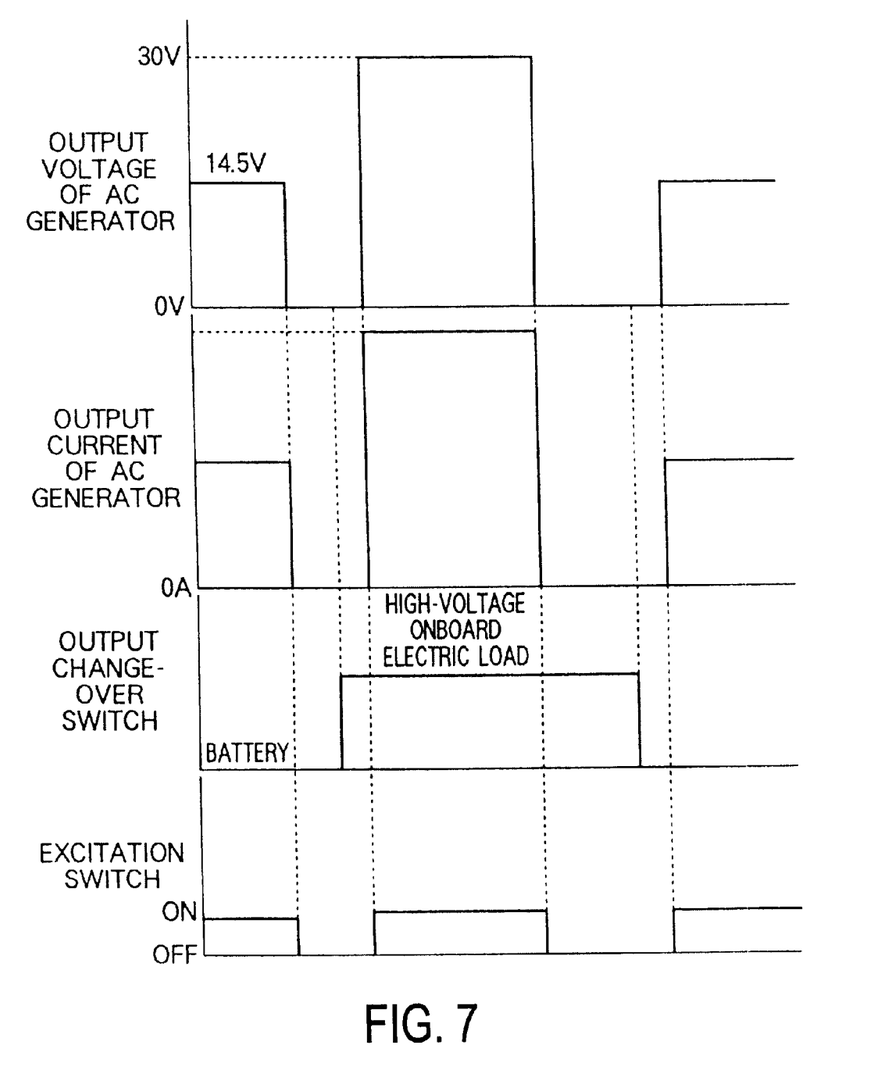
FIG. 7 is a waveform for illustrating graphically operation or behavior of an AC generator when the output thereof is changed over between a battery and a high-voltage onboard load by the conventional control apparatus.

During the high-voltage supply operation described above, the battery 4 is not charged but assumes the discharging state for supplying only the field current to the AC generator 1. For this reason, the high voltage supplying operation is limited to a short duration (e.g. about five minutes) in order to prevent the excessive discharge or overdischarge of the battery 4. On the other hand, when the terminal voltage of the battery 4 lowers below a preset level, the high-voltage load operation is stopped for thereby allowing the ordinary battery charging operation mode to be resorted. It will readily be understood without need for any further description that the sequential control described above can be carried out by executing a corresponding program with the processing unit incorporated in the output change-over circuit 7. Incidentally, FIG. 7 is a waveform diagram for illustrating operations in the state where the output of the AC generator 1 is changed over to the high-voltage onboard electric load 5.

The conventional AC generator control apparatus described above has a drawback that upon changing over of the operation mode from the ordinary battery charging operation to the high-voltage onboard-load power supply operation, the output of the AC generator rises up steeply, incurring problems such as belt slippage, lowering of engine rotation speed (rpm) due to steep increasing of engine load and the like. For coping with those problems, there has been proposed a method for controlling the output of the AC generator so that it increases gradually or progressively by putting into operation the onboard electric load in the battery charging operation mode and subsequently performing the change-over operation mentioned previously.

At this juncture, however, it is required that the time taken for controlling progressively or gradually (referred to as the gradual control time) the output power of the AC generator be constant independent of difference in the power demand upon changing-over of the loads. In this conjunction, the gradual control time set on the presumption that the operation mode from the AC generator high-power output operation mode (high-voltage operation) is changed over to the AC generator low-power output operation mode (battery charging operation mode) is relatively short. Consequently, upon operation mode changing-over or transition from the low-output operation mode (battery charging operation mode) to the AC generator high output mode (high-voltage operation mode), there arise problems such as belts slippage, lowering of engine rotation speed (rpm) and the like due to steep increase of the output power of the AC generator.

On the other hand, when the progressive control time is determined on the presumption that the AC generator output power is to be changed over from the low output power (battery charging operation mode) to the high AC generator output power (high-voltage operation mode), the aforementioned progressive control time is relatively long. Consequently, upon transition from the high AC generator output (high-voltage operation mode) to the low output (battery charging operation mode), the output power of the AC generator will unnecessarily be suppressed in excess, incurring possibly a problem that power demand required by loads such as illuminating lamps of the motor vehicle can not be accommodated due to overdischarge of the battery.

SUMMARY OF THE INVENTION

In the light of the state of the art described above, it is an object of the present invention to provide a control apparatus for an AC generator of a motor vehicle, which apparatus is substantially immune to the problems of the conventional control apparatuses described above.

More particularly, it is an object of the present invention to provide a control apparatus for an AC generator of a motor vehicle which can solve or mitigate the problem of variation of the engine rotation speed due to steep increase of the AC generator output power and/or steep decrease or increase of engine load as brought about by the change-over of the operation modes mentioned above regardless of difference in the output power of the AC generator between the different operation modes.

In view of the above and other objects which will become apparent as the description proceeds, there is provided according to a general aspect of the present invention a control apparatus for an AC generator of a motor vehicle, which apparatus includes a rectifier for rectifying a voltage generated by an AC generator which is driven by an internal combustion engine and includes a field coil, a battery charged with electric energy outputted from the rectifier, a high-voltage electric load of the motor vehicle supplied with electric energy from the output of the rectifier, a mode setting means for changing over the output of the rectifier to the battery or the high-voltage electric load of the motor vehicle to thereby set a battery charging operation mode or a high-voltage operation mode, and a voltage regulator for controlling a field current flowing through the field coil so that the field current increases gradually at rate of changes set for the operation modes, respectively, to thereby regulate an output voltage of the AC generator to a predetermined value in each of the operation modes as set.

In a preferred mode for carrying out the invention, the mode setting means may be adapted to set the battery charging operation mode or the high-voltage operation mode and output a control signal indicative of the rate of change of the field current in each of the operation modes. The voltage regulator changes over the operation modes of the AC generator by controlling the field current in accordance with the control signal.

In another preferred mode for carrying out the invention, the voltage regulator may include an identifying means for identifying discriminatively content of the control signal outputted from the mode setting means, a rate-of-change setting means for setting the rate of change of the field current on the basis of result of the identification of the control signal, and a current control means for controlling gradual increase of the field current in accordance with the rate of change as set.

In yet another preferred mode for carrying out the invention, the mode setting means may output a control signal for setting a low-voltage operation mode upon changing over to the high-voltage operation mode from the battery charging operation mode or upon changing over to the battery charging operation mode from the high-voltage operation mode. The current control means may then respond to the control signal for setting the low-voltage operation mode to thereby decrease the field current lower than the field current in the battery charging operation mode and the high-voltage operation mode.

In still another preferred mode for carrying out the invention, the mode setting means may be so arranged as to output the control signals for the operation modes, respectively, in the form of pulse train signals which differ from each other in respect to duty ratio.

In a further preferred mode for carrying out the invention, the mode setting means may be so arranged as to output the control signals for the operation modes, respectively, in the form of signals which differ from each other in respect to frequency.

In a yet further preferred mode for carrying out the invention, the mode setting means may be so arranged as to output the control signals for the operation modes, respectively, in the form of signals which differ from each other in respect to voltage level.

In a still further preferred mode for carrying out the invention, the rate-of-change setting means may be so implemented as to set the rate of change of the field current in changing-over of the operation mode from the battery charging operation mode to the high-voltage operation mode smaller than the rate of change of the field current in changing over of the operation mode from the high-voltage operation mode to the battery charging operation mode.

The identifying means may preferably be so arranged as to output the result of discriminative identification of the content of the control signal inputted from the mode setting means upon setting of the battery charging operation mode or upon setting of the high-voltage operation mode and converts the control signal to a voltage of a level corresponding to the operation mode as set, while converting the voltage to a voltage level corresponding to the control signal for the low-voltage operation mode with a predetermined time constant, to thereby set a rate of change of the field current for the low-voltage operation mode in the rate-of-change setting means.

The identifying means may preferably be so arranged as to invalidate a field current interruption control signal outputted in accordance with results of battery terminal voltage detection and rectifier output voltage detection, respectively, upon identification of the low-voltage operation mode.

The voltage regulator may preferably include an output voltage detecting means for detecting an output voltage of the AC generator. When the output voltage lowers below a predetermined value, the rates of change as set in the battery charging operation mode and the high-voltage operation mode is invalidated to thereby allow the field current to increase at a higher rate of change.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

Embodiment 1

Figure 1:
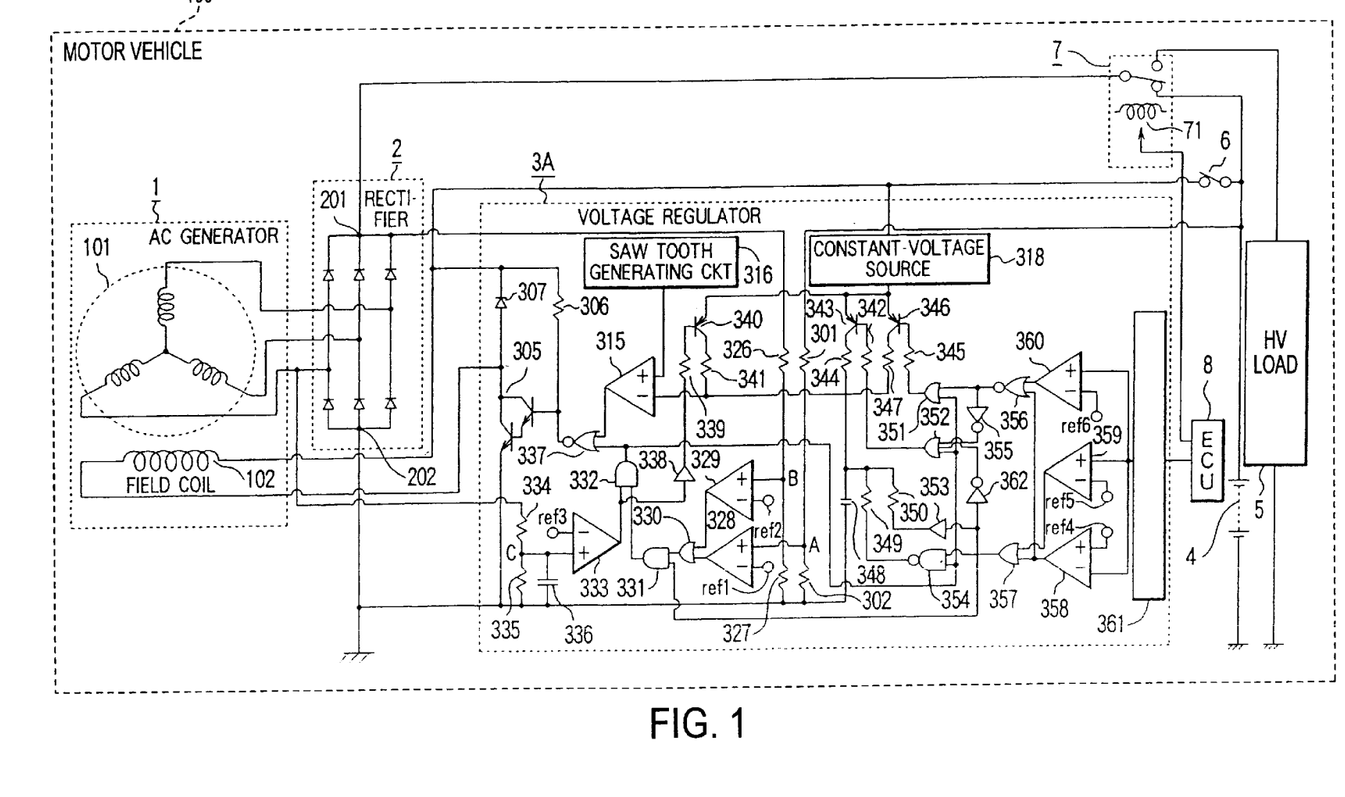
FIG. 1 is a circuit diagram showing a control apparatus for an AC generator of a motor vehicle according to a first embodiment of the present invention.

FIG. 1 is a circuit diagram showing a control apparatus for an AC generator of a motor vehicle according to a first embodiment of the present invention. In the figure, like reference characters as those used in FIG. 5 denote like or equivalent components.

Referring to FIG. 1, a voltage regulator 3A implemented in accordance with the teaching of the invention incarnated in the instant embodiment is composed of a duty-to-voltage converter 361 for converting a duty control signal outputted from an engine control unit 8A with duty ratios (or duty cycles) corresponding to a battery operation mode, low-voltage operation mode and a high-voltage operation mode, respectively, into voltages of the levels corresponding to the above-mentioned duty ratios or cycles, respectively, comparators 358, 359 and 360 having respective plus input terminals to which the converted voltage $V_D$ outputted from the duty-to-voltage converter 361 is applied and other input terminals to which reference voltages of different levels Ref4, Ref5 and Ref6 (where Ref4<Ref5<Ref6) are applied, respectively, for thereby outputting logical level signals indicative of the results of the comparison, an OR gate 357 having inputs to which the output signals of the comparators 358 and 359 are applied, respectively, a NOR gate 356 having inputs to which the output signals of the comparators 358 and 360 are applied, respectively, inverters 355 and 362 for inverting the output signals of the NOR gate 356 and the OR gate 357 and applying them to the inputs of an OR gate 352, respectively, an OR gate 351 to which the output signal of the NOR gate 356 is inputted, a non-inverter 353 to which the output signal of the OR gate 357 is inputted, and a NAND gate 354. Parenthetically, the OR gates 351 and 352 and the NAND gate 354 have the other input terminals, respectively, to which an output signal of an AND gate 332 is applied.

Furthermore, the voltage regulator 3A includes a constant-voltage source 318 for stabilizing the terminal voltage of the battery 4 to be constant to thereby generate a constant current and PNP-type transistors 340, 343 and 346 having respective emitters connected to the output terminals of the constant-voltage source 318, respectively, and collectors connected to one ends of resistors 341, 342 and 345, respectively, which have respective resistance values differing from one another. The PNP-type transistor 346 is turned on (made conducting) in response to the output signal of the OR gate 351 applied to the base via the resistor 345.

The transistor 343 is turned on (switched to the conducting state) in response to the output signal of the OR gate 352 applied to the base. The transistor 340 is turned on in response to the output signal of the non-inverter 33B inputted to the base via the resistor 339. The resistors 341, 344 and 347 having one ends connected to the collectors of the transistors 340, 343 and 346, respectively, are connected to one end of a capacitor 348 having the other and connected to the ground potential. The terminal voltage making appearance across the capacitor 348 is inputted to a minus input terminal of the comparator 315 which has the plus input terminal to which a saw-tooth wave voltage is constantly applied from a saw tooth generator 316.

Connected between a common junction point of the resistors 341, 344 and 347 and the capacitor 348 and the output of the NAND gate 354 or that of the non-inverter 353 are resistors 349 and 350, respectively. Consequently, the capacitor 348 is electrically charged from the constant voltage supply source by way of a resistor connected to the collector of the transistor upon turning-on thereof, while the capacitor 348 is discharged through a resistor connected to the output of the NAND gate 354 or the non-inverter 353. The comparator 315 compares the charging voltage of the capacitor 348 with the saw-tooth waveform voltage to thereby output a pulse train signal having a low-level duty ratio or cycle increasing in dependence on the change of the charging voltage level.

As a modification, the voltage regulator 3A may be constituted by a voltage division resistors 301 and 302 connected in series between the plus terminal of the battery 4 and the minus terminal of the rectifier 2 for detecting the terminal voltage of the battery 4, a comparator 328 having a plus input terminal connected to the voltage dividing point A between the voltage division resistors 301 and 302 and a minus input terminal to which the reference voltage Ref1 is applied, voltage division resistors 326 and 327 connected in series between the plus terminal 201 and the minus terminal of the rectifier 2 for detecting the rectifier output, a comparator 328 having a plus input terminal connected to the voltage dividing point B between the voltage division resistors 326 and 327 and a minus input terminal to which the reference voltage Ref2 is inputted, an OR gate 330 having inputs to which the output signals of the comparators 328 and 329 are supplied, respectively, and an AND gate 331 for logically ANDing the output signals of the OR gates 330 and 357, respectively.

Further, the voltage regulator 3A includes voltage division resistors 334 and 335 connected in series between an output line for one phase of the AC generator 1 for detecting the voltage generated by the AC generator 1, a capacitor 336 connected in parallel to the voltage division resistor 335 for smoothing the generator voltage as detected, a comparator 333 having a plus (+) input terminal applied with the smoothed generator voltage and a minus (−) input terminal to which the reference voltage Ref3 is applied, an AND gate 332 having inputs receiving the output signal of the comparator 333 and the output signal of the AND gate 331, and a NOR gate 337 having input terminals for receiving the output signal of the AND gate 332 together with the output signal of the comparator 315 to thereby output a signal to be applied to the base of the output transistor 305. In the control apparatus according to the instant embodiment of the invention, the output change-over controller 7A is constituted by an output change-over switch 71 which is adapted to be changed over by a control signal of the engine control unit 8, wherein the destination for supply of the electric power outputted from the rectifier 2 is changed over between the battery 4 and the high-voltage onboard electric load 5 by means of the output change-over switch 71.

Next, description will be directed to operation of the control apparatus.

The sequential control operation performed by the output change-over controller 7 is essentially same as in the case of the hitherto known control apparatus described hereinbefore. When the output change-over switch 71 of the output change-over controller 7 is closed to a contact leading to the battery 4, the battery charging operation mode is validated, while the high-voltage operation mode is validated when the output change-over switch 71 is closed to a contact leading to the high-voltage onboard electric load 5. In this conjunction, it should be mentioned that in precedence to the change-over operation by means of the switch 71, the engine control unit 8 once selects a low-voltage operation mode for decreasing the field current. Thereafter, the change-over of the operation modes mentioned previously is performed by the means of mode change-over switch 71.

In the voltage regulator 3A, the duty-ratio control signal issued by the engine control unit 8 is converted to a voltage $V_D$ by the duty-to-voltage converter 361. The voltage $V_D$ resulting from the conversion undergoes comparisons with reference voltages Ref4, Ref5 and Ref6 through the comparators 358, 359 and 360. The reference voltages Ref4, Ref5 and Ref6 bear such relation to one another that Ref4<Ref5<Ref6, wherein the comparator 358 is adapted for detecting the duty ratio of 10%, the comparator 359 is to detect the duty ratio of 30% and the comparator 360 is destined to detect the duty ratio of 90%.

Thus, when the duty-ratio control signal indicating the duty ratio smaller than 10% is inputted from the engine control unit 8, the output signal of the comparator 358 becomes high "H", while that of the comparator 359 is low "L" with the output signal of the comparator 360 being low "L". On the other hand, upon inputting of the duty-ratio control signal indicating the duty ratio greater than 10% and smaller than 30%, the output signal of the comparator 358 is low "L" with those of the comparator 359 and 360 being also low "L", respectively. Further, when a duty-ratio control signal indicating the duty ratio greater than 30% and smaller than 90% is inputted from the engine control unit 8, the output signal of the comparator 358 becomes low "L", while that of the comparator 359 is high "H" with the output signal of the comparator 360 being low "L". Upon inputting of the duty-ratio control signal indicative of the duty ratio greater than 90%, the output signal of the comparator 358 becomes low "L" with that of the comparator 359 being high "H" while the output signal of the comparator 360 becomes high "H".

In this conjunction, it is assumed that the duty-ratio control signal indicating the duty ratio greater than 10% or smaller than 90% commands the setting of the battery charging operation mode. On the other hand, the duty-ratio control signal representing the duty ratio greater than 10% and smaller than 30% indicates the low-voltage operation mode, while the duty-ratio control signal representing the duty ratio greater than 30% and smaller than 90% indicates the high-voltage operation mode. At first, operation in the battery charging operation mode will be explained. When the key switch 6 is closed for starting the engine, a field current will flow to the field coil 102 from the battery 4 by way of the key switch 6, whereby the AC generator is set to the state ready for generation of electric energy. When the engine operation is started, the AC generator 1 starts generation of electricity, as a result of which the voltage at the plus terminal 201 increases, which is accompanied with rise-up of the terminal voltage of the battery 4.

The terminal voltage of the battery 4 detected at the voltage dividing point A formed by the voltage division resistors 301 and 302 is compared with the reference voltage Ref1 by the comparator 328. When the voltage at the voltage dividing point A exceeds the reference voltage Ref1, the output signal of the comparator 328 becomes high "H". Further, the voltage of the plus terminal 201 detected at the voltage dividing point B formed by the voltage division resistors 326 and 327 is compared with the reference voltage Ref2, the output signal of the comparator 329 assumes a high level "H". However, in the battery charging operation mode, the voltage at the voltage dividing point B does not exceed the reference voltage Ref2. Thus, the output signal of the comparator 329 in this mode is low "L".

Further, the voltage of the armature winding 101 detected at the voltage dividing point C formed by the voltage division resistors 334 and 335 and smoothed undergoes comparison with the reference voltage Ref3 by the comparator 333. When the voltage at the voltage dividing point C is lower than the reference voltage Ref3, the output signal of the comparator 333 becomes low. However, since the voltage at the voltage dividing point C becomes lower than the reference voltage Ref3 only in the low-voltage operation mode so long as the AC generator is in the generation mode, the output of the comparator 333 assumes high level "H" in other operation modes than the low-voltage operation mode.

Thus, when the terminal voltage of the battery 4 rises up to a level at which the voltage at the voltage dividing point A exceeds the reference voltage Ref1, the output signal of the comparator 328 becomes high. Consequently, the output signals of the OR gate 330, the AND gate 331 and the AND gate 332 become high while that of the NOR gate 337 becomes low, whereby the output transistor 305 is set to the non-conducting state (off-state). As a result of this, the field current is caused to decrease with a time constant T1 of the field coil 102 via the diode 307. Thus, the output voltage of the AC generator 1 is lowered, causing the terminal voltage of the battery 4 to be lowered correspondingly.

The comparator 315 compares the saw-tooth voltage generated by the saw tooth generator 316 with the terminal voltage of the capacitor 348. When the terminal voltage of the capacitor 348 is lower than the saw-tooth voltage, the output signal of the comparator 315 becomes high. Consequently, the output signal of the NOR gate 337 receiving the output signal of the comparator 315 becomes low, whereby the output transistor 305 is set to the off-state (non-conducting state).

In the operation mode now under consideration, the output signal of the comparator 360 is high with that of the comparator 358 being equally high. Consequently, the output signal of the NOR gate 356 is low, which is inverted by the inverter 355 to be high. In other words, the output signal of the inverter 355 is high. On the other hand, the output signal of the OR gate 357 receiving the output signal of the comparator 358 is high. Consequently, the output signal of the inverter 362 is low. When the output signal of the AND gate 332 is high, the capacitor 348 is discharged through the resistor 349 with a time constant T2 (=capacitance of capacitor 348 multiplied by resistance of the resistor 349, e.g. one second), because the output signal of the voltage division resistor 334 is at low level.

When the output signal of the AND gate 332 is low with that of the OR gate 351 being also low, the PNP-type transistor 346 is set to the conducting state (on-state), as a result of which the capacitor 348 is electrically charged with a time constant T3 (=capacitance of the capacitor 348× resistance of the resistor 347, e.g. 5 seconds) by way of the resistor 347. In this manner, charging and discharging of the capacitor 348 is controlled in dependence on the output signal of the AND gate 332, whereby the duty of the field current interrupted respectively is stored in the form of a charge voltage of the capacitor 348.

In the steady state, the comparator 315 outputs a pulse signal having a constant duty ratio. Accordingly, when the terminal voltage of the battery 4 lowers in accompanying decrease of the field current and hence lowering of the terminal voltage of the AC generator 1, the voltage at the voltage dividing point A becomes lower than the reference voltage Ref1, which results in that the output signals of the comparator 328, the OR gate 330 and the AND gate 331 are low, respectively. Consequently, the output signal of the AND gate 332 becomes low. However, the comparator 315 outputs the pulse signal of the constant duty ratio.

Starting from a time point at which the output signal of the AND gate 332 becomes low with that of the NAND gate 354 being high while the output signal of the OR gate 352 is low, the duty ratio of low level (hereinafter also referred to as the low duty ratio) of the output pulse signal of the comparator 315 increases with the time constant T3 as the capacitor 348 is charged with the time constant T3. Because the output pulse signal of the comparator 315 is inverted by the NOR gate 337, the duty ratio of high level (hereinafter also referred to as the high duty ratio) of the pulse signal outputted from the NOR gate 337 increases with the time constant T3, whereby the ratio of conduction (also referred to as on-ratio) of the output transistor 305 increases with the time constant T3. As an overall result, the field current increases with the time constant T3, incurring rise-up of the output voltage of the AC generator 1 as well as that of the terminal voltage of the battery 4.

In this manner, the field current flowing through the field coil 102 undergoes continuously the on/off control of the output transistor 305, whereby the trimanual voltage of the battery 4 is regulated to a first predetermined value (e.g. 14.5 volts). Subsequently, when the duty-to-voltage converter 361 detects the signal of the duty ratio greater than 10% and smaller than 30% which is outputted from the engine control unit 8 and indicates the low-voltage operation mode, the output signals of the comparators 358, 359 and 360 become low, respectively. Accordingly, the output signal of the NOR gate 356 is high while that of the inverter 355 is low. Further, the output signal of the OR gate 357 is low while that of the inverter 362 is high with that of the non-inverter 353 being low.

Thus, since the capacitor 348 is discharged via the resistor 350 with a time constant T4 (=capacitance 348×resistance 350, e.g. 5 seconds), the high duty ratio (i.e., duty ratio of high level) of the pulse signal outputted from the comparator 315 increases with the time constant T4. Thus, the low duty ratio (i.e., duty ratio of low level) of the output pulse signal of the NOR gate 337 increases with the time constant T4, which in turn means that the conduction ratio (i.e., ratio of on-state duration) of the output transistor 305 deceases with the time constant T4 while the output voltage of the AC generator 1 decreasing with the time constant T4.

In this case, because the voltage of the armature winding 101 also lowers with the time constant T4, the output signal of the comparator 333 becomes low with that of the non-inverter 338 being low, to thereby turn on the transistor 340, when the voltage at the voltage dividing point C lowers below the reference voltage Ref3. Thus, the capacitor 348 is charged with a time constant T6 (=capacitance 348× resistance 341=T1) via the resistor 341, whereby the terminal voltage of the capacitor 348 rises up with the time constant T6.

As the terminal voltage of the capacitor 348 increases, the high duty ratio of the output pulse signal of the comparator 315 decreases with the time constant T6, and thus the low duty ratio of the output pulse signal of the NOR gate 337 decreases with the time constant. T6. Consequently, the field current increases with the time constant T6 while the voltage of the armature winding 101 also increasing correspondingly.

At this time, the voltage at the voltage dividing point C rises up. When this voltage exceeds the reference voltage Ref3, the output signal of the comparator 333 becomes high with that of the non-inverter 338 also becoming high, which results in that the PNP-type transistor 340 is turned off to prevent the capacitor 348 from being charged. Again, the capacitor 348 is discharged with the time constant T4 to thereby regulate the peak voltage of the armature winding 101 to a second predetermined value, for example, for five seconds (low-voltage operation mode).

In this state, the output change-over switch 71 is changed over from a the battery 4 to the high-voltage onboard electric load 5 in response to a corresponding signal issued from the engine control unit 8. When the duty-ratio control signal commanding the duty ratio greater than 30% and smaller than 90% is issued from the engine control unit 8 after the change-over of the output change-over switch 71, the operation mode makes transition to the high-voltage operation mode.

In the high-voltage operation mode, the terminal voltage of the battery 4 does not rise to thereby hold the operation signal of the comparator 328 at low level. Since the voltage at the voltage dividing point B does not exceed the reference voltage Ref2 until the output voltage of the AC generator 1 exceeds a third predetermined value or level (e.g. 30 volts), the output signal of the comparator 329 is low and hence the output signal of the OR gate 330 is low. Consequently, the output signals of the AND gates 331 and 332 are low, respectively.

As a result, the output signal of the OR gate 357 assumes a high level, whereby the output signal of the non-inverter 353 is caused to assume a high level while the output signal of the inverter 362 assuming a low level. Furthermore, because the output signal of the NOR gate 356 is high, the output signal of the inverter 355 becomes low. Additionally, because the output signal of the NOR gate 356 is high, the output signal of the inverter 355 is low. Furthermore, since the output signal of the AND gate 332 becomes low, the output signal of the NAND gate 354 is high. With the high output signal of the OR gate 351, the PNP-type transistor 346 is turned off, while in response to the low output signal of the OR gate 352, the PNP-type transistor 343 is turned on, whereby the capacitor 348 is charged with the time constant T5 (=capacitance 348×resistance 344, e.g. ten seconds). Thus, the high duty ratio (i.e., duty ratio of high level) of the output pulse signal of the comparator 315 decreases with the time constant T5.

Now, the high duty ratio of the output pulse signal of the NOR gate 337 increases with the time constant T5 to make the conduction ratio of the output transistor 305 increase with the time constant T5. Thus, the field current increases with the time constant T5, which causes the output voltage of the AC generator 1 to rise up with the time constant T5. In this manner, the power supply to the high-voltage load of the motor vehicle increases with the time constant T5.

When the output voltage of the AC generator 1 exceeds the third predetermined value, the voltage at the voltage dividing point B exceeds the reference voltage Ref2 with the output signal of the comparator 329 assuming the high level, as a result of which output signals of the OR gate 330 and the AND gates 331 and 332 become high, respectively, which results in that the output signal of the NOR gate 337 assumes the low level. Consequently, the output transistor 305 is set to the non-conducting state.

Thus, the field current decreases with the time constant T1, being accompanied by lowering of the output voltage of the AC generator 1 with the time constant T1. In this manner, the output transistor 305 performs continuously on/off control of the field current flowing through the field coil 102 to thereby regulate the output voltage of the AC generator 1 to the third predetermined value or level (e.g. 30 volts).

After lapse of a predetermined time (about one minute) from a time point when the high-voltage operation mode was validated, the engine control unit 8 issues the duty ratio control signal indicating the duty ratio greater than 10% and smaller than 30%. Upon detection of this duty ratio control signal by the duty-to-voltage converter 361, the low-voltage operation mode is validated, whereby the output voltage of the AC generator 1 lowers with the time constant T4 to be thereby regulated to the second predetermined level (e.g. 5 volts). In this state, the output of the output change-over switch 71 is changed over to the battery 4 from the high-voltage onboard electric load 5 in response to the switching command issued by the engine control unit 8. After the change-over of the rectifier output, the operation mode makes transition to the battery charging operation mode in response to the duty-ratio control signal commanding the duty ratio smaller than 10% issued from the engine control unit 8.

Figure 5:
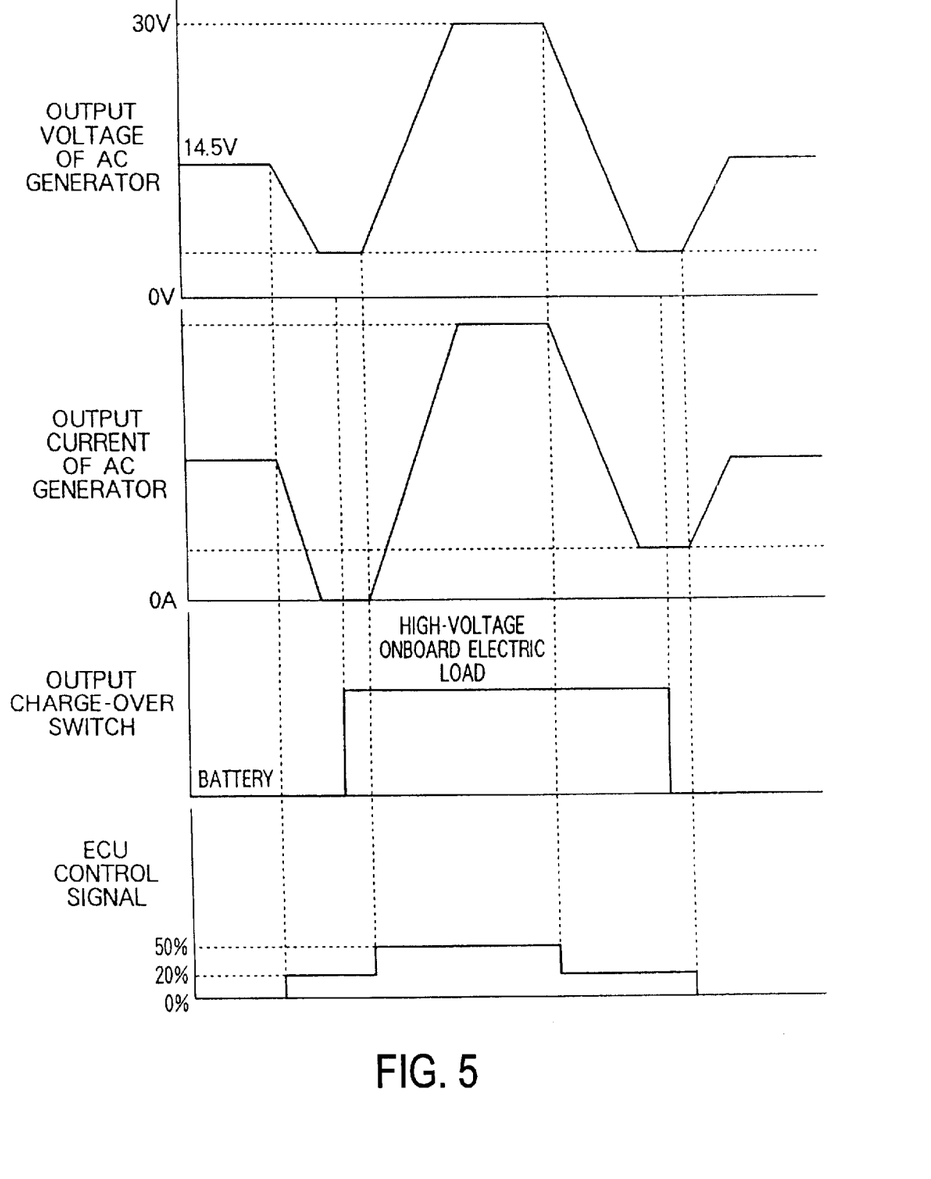
FIG. 5 is a waveform for illustrating graphically operation or behavior of an AC generator when the output thereof is changed over between a battery and a high-voltage onboard load.

More specifically, the output voltage of the AC generator 1 is caused to rise up with the time constant T2 from the second predetermined level (5 volts) to be thereby regulated to the first predetermined value. FIG. 5 is a view for graphically illustrating operations of the various parts of the control apparatus effected upon change-over of the output of the AC generator 1. When the signal indicating the duty ratio greater than 90% is issued by the engine control unit 8 (inclusive of connection to the ground potential), the battery charging operation mode is validated.

Embodiment 2

Figure 2:
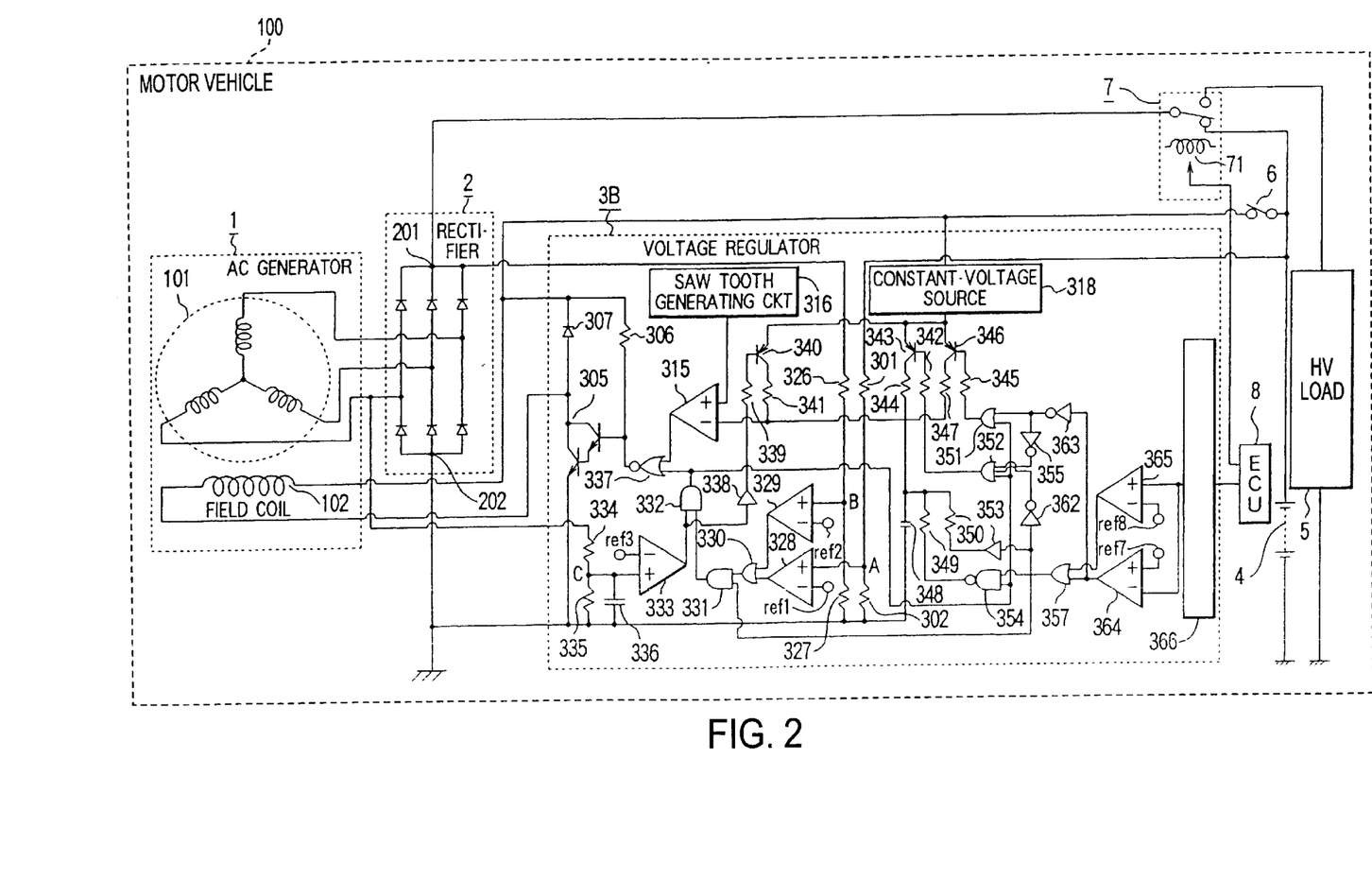
FIG. 2 is a circuit diagram showing a control apparatus according to a second embodiment of the present invention.

FIG. 2 is a circuit diagram showing a configuration of the control apparatus for the AC generator of a motor vehicle according to a second embodiment of the present invention. In the case of the instant embodiment, the control apparatus is denoted by a reference character 3B. Parenthetically, same or like reference characters used in FIG. 2 denote same or equivalent parts shown in FIG. 1. In the control apparatus according to the instant embodiment of the invention, the reference voltages of the comparators 364 and 365 are designated by Ref7 and Ref8, respectively, wherein the comparator 364 and 365 are destined for detecting the duty ratios of 20% and 80%, respectively.

The output signal of the inverter 363 receiving the output of the comparator 364 is inputted to the OR gate 351 and the inverter 355, respectively. With this arrangement, when the duty ratio commanded by the duty ratio control signal issued from the engine control unit 8 is zero percentage (0%), the duty-to-voltage converter 366 inputs to the comparators 364 and 365 a voltage signal of such a level that the output signal of the comparator 364 assumes the high level "H" while the output signal of the comparator 365 assumes the low level "L" when compared with the reverence voltages Ref7 and Ref8, respectively.

As a result of this, the output voltage of the AC generator is regulated to a first predetermined level (e.g. 14.5 volts) in the battery charging operation mode. More specifically, starting from a time point at which the output signal of the NAND gate 354 becomes low with that of the OR gate 352 being high, the low duty ratio of the output pulse signal of the comparator 315 increases with the time constant T3 as the capacitor 348 is charged with the time constant T3.

Because the low duty ratio of the output pulse signal of the comparator 315 is inverted by the NOR gate 337, the duty ratio of high level of the pulse signal outputted from the NOR gate 337 increases with the time constant T3, whereby the ratio of conduction (also referred to as on-ratio) of the output transistor 305 increases with the time constant T3. As an overall result, the field current increases with the time constant T3, incurring rise-up of the output voltage of the AC generator 1 as well as that of the terminal voltage of the battery 4.

Subsequently, when the duty ratio of the duty ratio control signal issued from the engine control unit 8 becomes 100%, the voltage resulting from the conversion by the duty-to-voltage converter 366 rises up with a time constant TD. When a voltage indicating that the duty ratio is greater than 20%, the output signal of the comparator 364 becomes low, whereupon output signal enters the low-voltage operation mode. Thus, the output voltage of the AC generator 1 decreases with the time constant T4 to be thereby regulated to the second predetermined value (e.g. 5 volts).

More specifically, when the duty-to-voltage converter 361 detects the signal of the low duty ratio outputted from the engine control unit 8 and indicates the low-voltage operation mode, the output signals of the comparators 364 and 365 become low, respectively. Accordingly, the output signal of the NOR gate 356 is high. Further, the output signal of the NOR gate 356 is low while that of the inverter 355 is low with that of the OR gate 357 being low, wherein the output signal of the inverter 362 is high with that of the non-inverter 353 being low.

Thus, since the capacitor 348 is discharged via the resistor 350 with a time constant T4 (=capacitance 348×resistance 350, e.g. 5 seconds), the high duty ratio (i.e., duty ratio of high level) of the pulse signal outputted from the comparator 315 increases with the time constant T4. Thus, the low duty ratio (i.e., duty ratio of low level) of the output pulse signal of the NOR gate increases with the time constant T4, which in turn means that the conduction ratio of the output transistor 305 deceases with the time constant T4. Consequently, output voltage of the AC generator 1 decreases with the time constant T4, whereby the voltage of the armature winding 101 is also lowered with the time constant T4.

In this case, the output signal of the comparator 333 becomes low with that of the non-inverter 338 being low, to thereby turn on the transistor 340, when the voltage at the voltage dividing point C lowers below the reference voltage Ref3. Thus, the capacitor 348 is charged with a time constant T6 (=capacitance 348×resistance 341=T1) via the resistor 341, whereby the terminal voltage of the capacitor 348 rises up with the time constant T6.

As the terminal voltage of the capacitor 348 increases, the high duty ratio of the output pulse signal of the comparator 315 decreases with the time constant T6, and thus the low duty ratio of the output pulse signal of the NOR gate 337 decreases with the time constant T6. Consequently, the field current increases with the time constant T6 while the voltage of the armature winding 101 also increasing correspondingly.

At this time, the voltage at the voltage dividing point C rises up. When this voltage exceeds the reference voltage Ref3, the output signal of the comparator 333 becomes high with that of the non-inverter 338 also becoming high, which results in that the PNP-type transistor 340 is turned off to prevent the capacitor 348 from being charged. Again, the capacitor 348 is discharged with the time constant T4 to thereby regulate a peak voltage of the armature winding 101 to a second predetermined value, for example, five seconds (low-voltage operation mode).

Further, when the voltage resulting from conversion by the duty-to-voltage converter 366 reaches the voltage corresponding to a voltage level indicating the duty ratio greater than 80%, the output signal of the comparator 365 becomes high, as a result of which the operation mode makes transition to the high-voltage operation mode. Consequently, the output voltage of the AC generator 1 rises up from the second predetermined value (5 volts) with the time constant T5 to be thereby regulated to the third predetermined value.

In the high-voltage operation mode, the terminal voltage of the battery 4 does not rise to thereby hold the output signal of the comparator 328 at low level. Since the voltage at the voltage dividing point B does not exceed the reference voltage Ref2 until the output voltage of the AC generator 1 exceeds the third predetermined value or level (e.g. 30 volts), the output signal of the comparator 329 is low and hence the output signal of the OR gate 330 is low. Consequently, the output signals of the AND gates 331 and 332 are low, respectively.

As a result, the output signal of the OR gate 357 assumes a high level, whereby the output signal of the non-inverter 353 is caused to assume a high level while the output signal of the inverter 362 assuming a low level. Furthermore, because the output signal of the NOR gate 356 is high, the output signal of the inverter 355 becomes low. Additionally, the output signal of the inverter 355 is low. Furthermore, the output signal of the NOR gate 356 is high. With the high output signal of the OR gate 351, the PNP-type transistor 343 is turned on, while the PNP-type transistor 343 is turned on, whereby the capacitor 348 is charged with the time constant T5 (=capacitance 348×resistance 344, e.g. ten seconds). Thus, the high duty ratio (i.e., duty ratio of high level) of the output pulse signal of the comparator 315 decreases with the time constant T5.

Now, the high duty ratio of the output pulse signal of the NOR gate 337 increases with the time constant T5 to make the conduction ratio of the output transistor 305 increase with the time constant T5. Thus, the field current increases with the time constant T5, which causes the output voltage of the AC generator 1 to rise up with the time constant T5. In this manner, the power supply to the high-voltage load of the motor vehicle increases with the time constant T5.

Accordingly, by changing over the output change-over switch 71 to the high-voltage onboard electric load 5 from the battery 4 in the state where the output voltage of the AC generator (Alternating current generator) 1 is regulated to the second predetermined value (five volts), operation similar to that of the control apparatus according to the first embodiment can be realized. The same applies valid to changing-over of the signal from engine control unit 8 to 0% from 100%. By setting the conversion time constant TD of the duty-to-voltage converter 366 appropriately (e.g. TD>T4), it is possible to change over the command signal of the engine control unit between 0% and 100%, there can be realized change-over of the operation mode among the capacitor charge operation mode, the low-voltage operation mode and the high-voltage operation mode.

Embodiment 3

Figure 3:
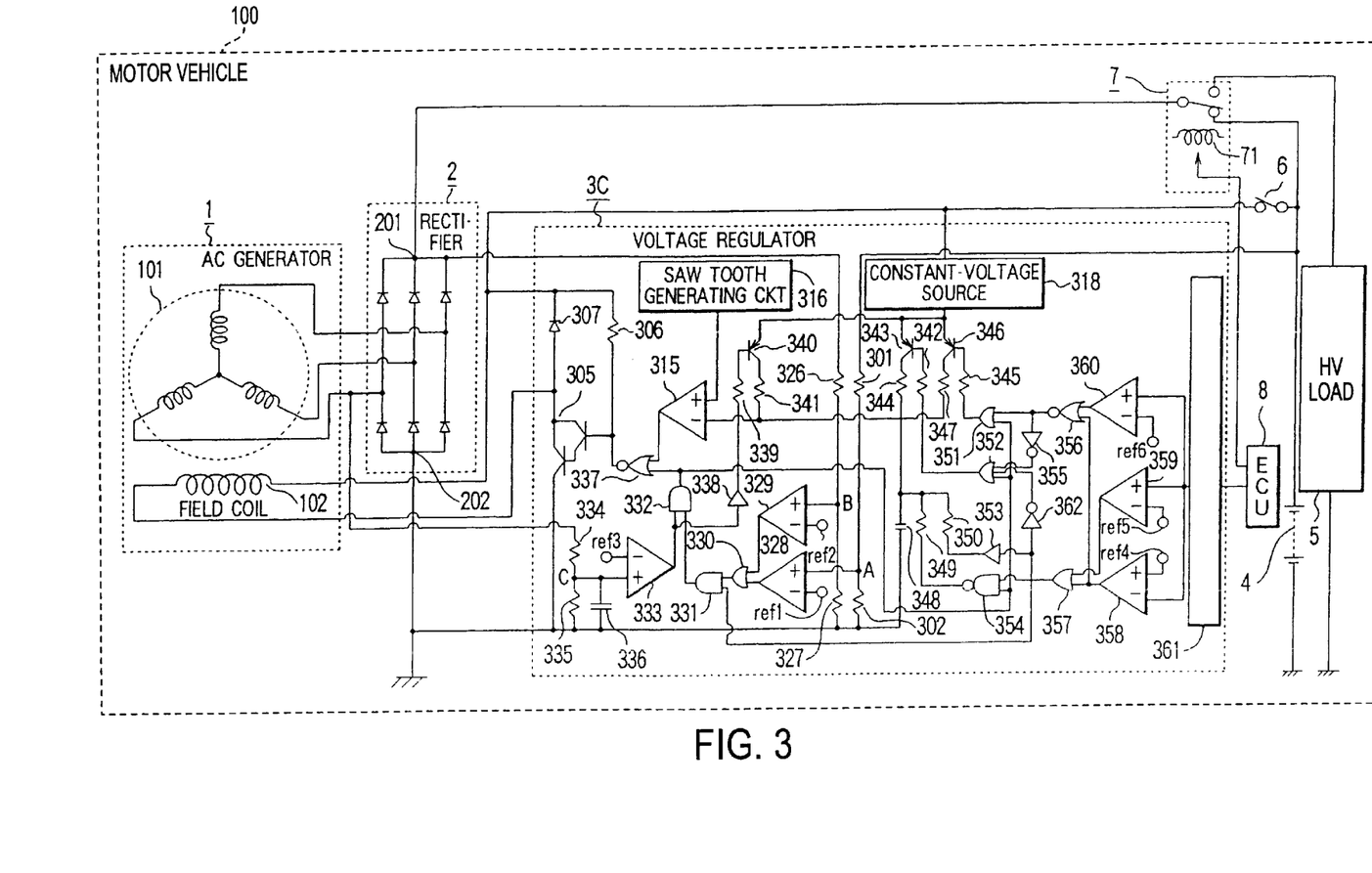
FIG. 3 is a circuit diagram showing a control apparatus according to a third embodiment of the present invention.

In the case of the control apparatuses according to the first and second embodiments, the individual operation modes are identified discriminatively by making different the duty ratio of the control signal. According to a third embodiment of the invention, it is proposed that a frequency signal is issued by the ECU so that the operation modes can be identified on the basis of differences in the frequency. Referring to FIG. 3 which shows a control apparatus for an AC generator according to a third embodiment of the invention, the voltage regulator 3C according to the instant embodiment of the invention is provided with a frequency-to-voltage converter 367 which is supplied with the frequency signal from the engine control unit 8 to thereby identify the operation mode to be validated by the mode change-over operation on the basis of the frequency of the frequency signal and then convert the frequency signal into a voltage level corresponding to the operation mode. Except for this difference, the voltage regulator 3C is substantially identical with the voltage regulator 3A of the control apparatus according to the first embodiment in respect to the structure as well as the operation.

Embodiment 4

Figure 4:
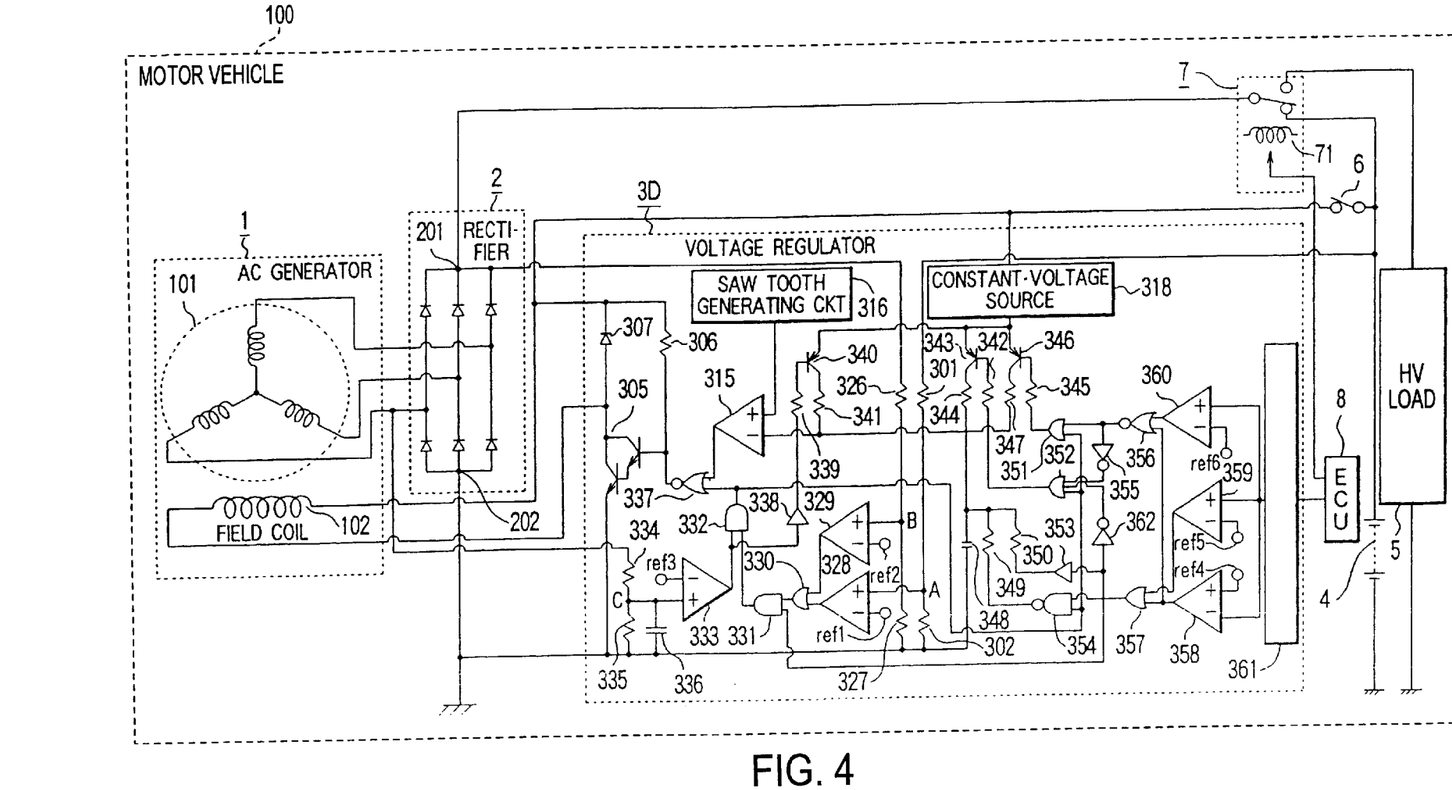
FIG. 4 is a circuit diagram showing a control apparatus according to a fourth embodiment of the present invention.

In the case of the control apparatuses according to the first and second embodiments, the individual operation modes are identified discriminatively by making different the duty ratio of the control signal. According to a fourth embodiment of the invention, it is proposed that a voltage signal is issued by the ECU so that the operation modes can be identified on the basis of differences in the voltage level. Referring to FIG. 4 which shows a control apparatus for an AC generator according to a third embodiment of the invention, the voltage regulator 3D according to the instant embodiment of the invention is provided with a voltage level converter 368 which is supplied with the voltage signal from the engine control unit 8 to thereby identify the operation mode to be validated by the mode change-over operation on the basis of the voltage levels of the voltage signal and then convert the voltage level signal into a voltage signal corresponding to the operation mode. Except for this difference, the voltage regulator 3D is substantially identical with the voltage regulator 3A of the control apparatus according to the first embodiment in respect to the structure as well as the operation.

The control apparatuses the AC generator according to the invention can enjoy advantages mentioned below.

Because the change-over of the battery charging operation mode and the high-voltage operation mode is effected by way of the interposed low-voltage operation mode, damage due to spark produced by the output change-over controller 7 upon mode change-over can be suppressed, to an advantage.

Because there is no need for additionally providing an initial excitation circuit for effecting the change-over from the battery charging operation mode to the high-voltage operation mode, the control apparatus can be implemented inexpensively in a simplified structure, to another advantage.

By virtue of such arrangement that duty ratio of the field current as interrupted is increased at predetermined rates in the battery charging operation mode and the high-voltage operation mode, respectively, while upon changing-over of the operation mode from the battery charging operation mode and the high-voltage operation mode to the low-voltage operation mode, the duty ratio of the interrupted field current is decreased at a predetermined rate lower than the aforementioned rates, steep variation of the engine rotation speed due to variation in the load of the AC generator can effectively be suppressed, whereby the engine rotation speed control can be performed with high accuracy an reliability, to further advantage.

Many modifications and variations of the present invention are possible in the light of the above techniques. It is therefore to be understood that within the scope of the appended claims, the invention may be practiced otherwise than as specifically described.

What is claimed is:

1. A control apparatus for an AC generator of a motor vehicle, comprising:

a rectifier for rectifying a voltage generated by an AC generator which is driven by an internal combustion engine and has a field coil;

a battery charged with electric energy outputted from said rectifier;

a high-voltage electric load of said motor vehicle supplied with electric energy from the output of said rectifier;

mode setting means for changing over the output of said rectifier to said battery or said high-voltage electric load of the motor vehicle to thereby set a battery charging operation mode or a high-voltage operation mode; and a voltage regulator for controlling a field current flowing through said field coil so that said field current increases gradually at rates of change set for said operation modes, respectively, to thereby regulate an output voltage of said AC generator to a predetermined value in each of said operation modes as set;

wherein said mode setting means for setting said battery charging operation mode or said high-voltage operation mode outputs a control signal indicative of said rate of change of field current in each of said operation modes;

wherein said voltage regulator changes over an operation mode of said AC generator by controlling a field current in accordance with said control signal; and wherein said voltage regulator includes
   identifying means for identifying discriminantly content of said control signal outputted from said mode setting means;
   rate-of-change setting means for setting the rate of change of said field current on the basis of result of the identification of said control signal; and
   current control means for controlling gradual increase of said field current in accordance with said rate of change as set.

2. A control apparatus for an AC generator of a motor vehicle according to claim 1, wherein said mode setting means outputs a control signal for setting a low-voltage operation mode upon changing over to said high-voltage operation mode from said battery changing operation mode or upon changing over to said battery charging operation mode from said high-voltage operation mode, and wherein said current control means responds to said control signal for setting the low-voltage operation mode to thereby decrease the field current lower than the field current in said battery charging operation mode and said high-voltage operation mode.

3. A control apparatus for an AC generator of a motor vehicle according to claim 1, wherein said mode setting means outputs said control signals for said operation modes, respectively, in the form of pulse train signals which differ from each other in respect to duty ratio.

4. A control apparatus for an AC generator of a motor vehicle according to claim 1, wherein said rate-of-change setting means sets the rate of change of the field current in changing-over of the operation mode from said battery charging operation mode to said high-voltage operation mode smaller than the rate of change of the field current in changing-over of the operation mode from said high-voltage operation mode to said battery charging operation mode.

5. A control apparatus for an AC generator of a motor vehicle according to claim 1, wherein said identifying means outputs the result of discriminative identification of the content of said control signal inputted from said mode setting means upon setting of the battery charging operation mode or upon setting of the high-voltage operation mode and converts said control signal to a voltage of a level corresponding to the operation mode as set, while converting said voltage to a voltage level corresponding to the control signal for the low-voltage operation mode with a predetermined time constant, to thereby set a rate of change of the field current for said low-voltage operation mode in said rate-of-change setting means.

6. A control apparatus for an AC generator of a motor vehicle according to claim 1, wherein said identifying means invalidates a field current interruption control signal outputted in accordance with results of battery terminal voltage detection and rectifier output voltage detection, respectively, upon identification of said low-voltage operation mode.

7. A control apparatus for an AC generator of a motor vehicle according to claim 1, said voltage regulator including output voltage detecting means for detecting an output voltage of the AC generator, wherein when said output voltage lowers below a predetermined value, the rates of change as set in said battery charging operation mode and said high-voltage operation mode is invalidated to thereby allow the field current to increase at a higher rate of change.

8. A control apparatus for an AC generator of a motor vehicle, comprising:

a rectifier for rectifying a voltage generated by an AC generator which is driven by an internal combustion engine and has a field coil;

a battery charged with electric energy outputted from said rectifier;

a high-voltage electric load of said motor vehicle supplied with electric energy from the output of said rectifier;

mode setting means for changing over the output of said rectifier to said battery or said high-voltage electric load of the motor vehicle to thereby set a battery charging operation mode or a high-voltage operation mode; and a voltage regulator for controlling a field current flowing through said field coil so that said field current increases gradually at rates of change set for said operation modes, respectively, to thereby regulate an output voltage of said AC generator to a predetermined value in each of said operation modes as set;

wherein said mode setting means for setting said battery charging operation mode or said high-voltage operation mode outputs a control signal indicative of said rate of change of field current in each of said operation modes;

wherein said voltage regulator changes over an operation mode of said AC generator by controlling a field current in accordance with said control signal; and wherein said mode setting means outputs said control signals for said operation modes, respectively, in the form of signals which differ from each other in respect to frequency.

9. A control apparatus for an AC generator of a motor vehicle, comprising:

a rectifier for rectifying a voltage generated by an AC generator which is driven by an internal combustion engine and has a field coil;

a battery charged with electric energy outputted from said rectifier;

a high-voltage electric load of said motor vehicle supplied with electric energy from the output of said rectifier;

mode setting means for changing over the output of said rectifier to said battery or said high-voltage electric load of the motor vehicle to thereby set a battery charging operation mode or a high-voltage operation mode; and a voltage regulator for controlling a field current flowing through said field coil so that said field current increases gradually at rates of change set for said operation modes, respectively, to thereby regulate an output voltage of said AC generator to a predetermined value in each of said operation modes as set;

wherein said mode setting means for setting said battery charging operation mode or said high-voltage operation mode outputs a control signal indicative of said rate of change of field current in each of said operation modes;

wherein said voltage regulator changes over an operation mode of said AC generator by controlling a field current in accordance with said control signal; and wherein said mode setting means outputs said control signals for said operation modes, respectively, in the form of signals which differ from each other in respect to voltage level.

* * * * *

UNITED STATES PATENT AND TRADEMARK OFFICE
CERTIFICATE OF CORRECTION

PATENT NO.     : 6,384,551 B1                                          Page 1 of 1
DATED          : May 7, 2002
INVENTOR(S)    : Hirofumi Watanabe It is certified that error appears in the above-identified patent and that said Letters Patent is hereby corrected as shown below:

<u>Title page,</u>
Item [*], Notice, please change "0 days" to -- 903 days --.

Signed and Sealed this

Twenty-fourth Day of September, 2002

Attest:

Attesting Officer

JAMES E. ROGAN
*Director of the United States Patent and Trademark Office*